Feb. 17, 1948. K. J. KLENK 2,436,260
PRUNING SHEARS AND THE LIKE
Filed June 19, 1945 3 Sheets-Sheet 2
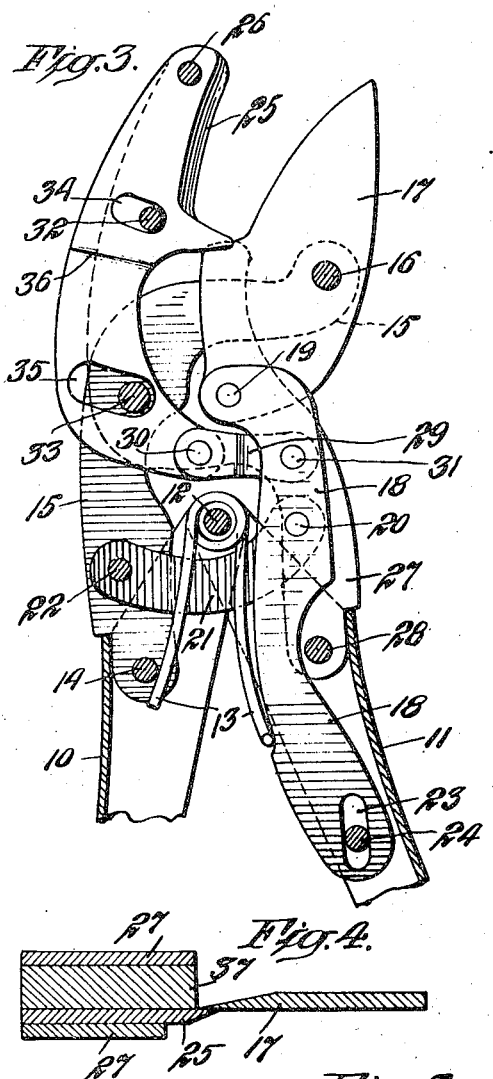
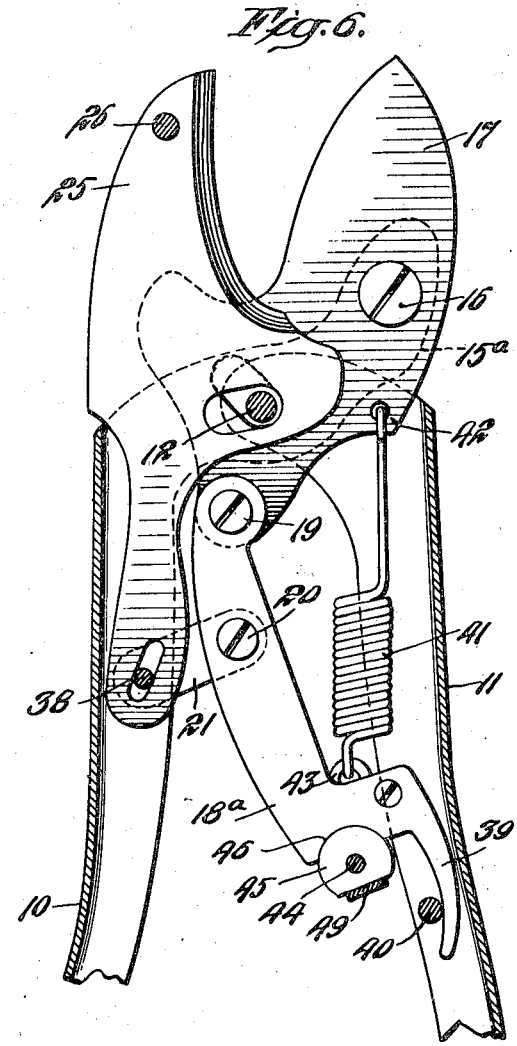
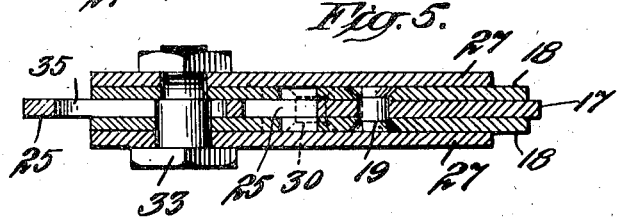
INVENTOR
KARL J. KLENK
BY
ATTORNEY

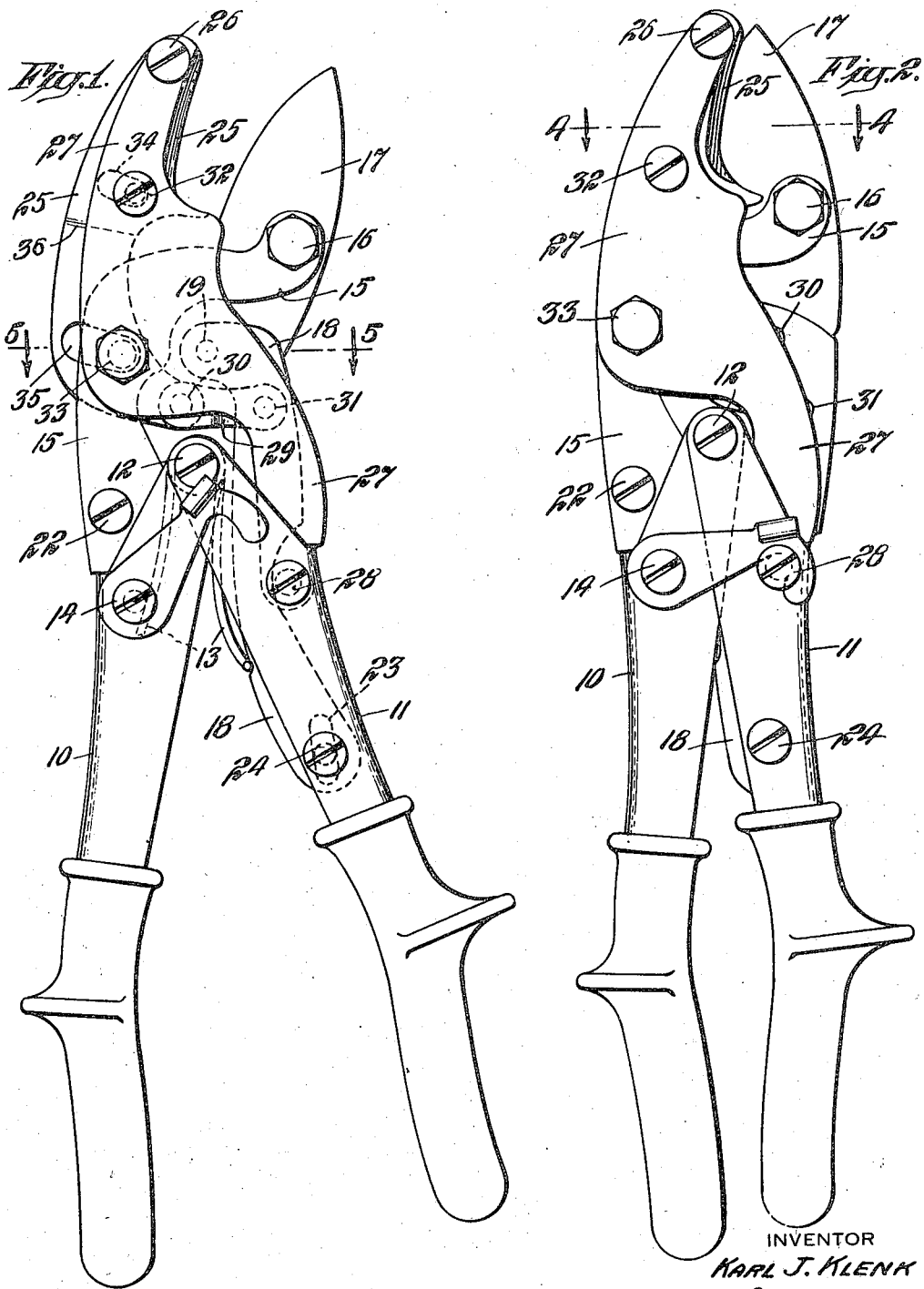

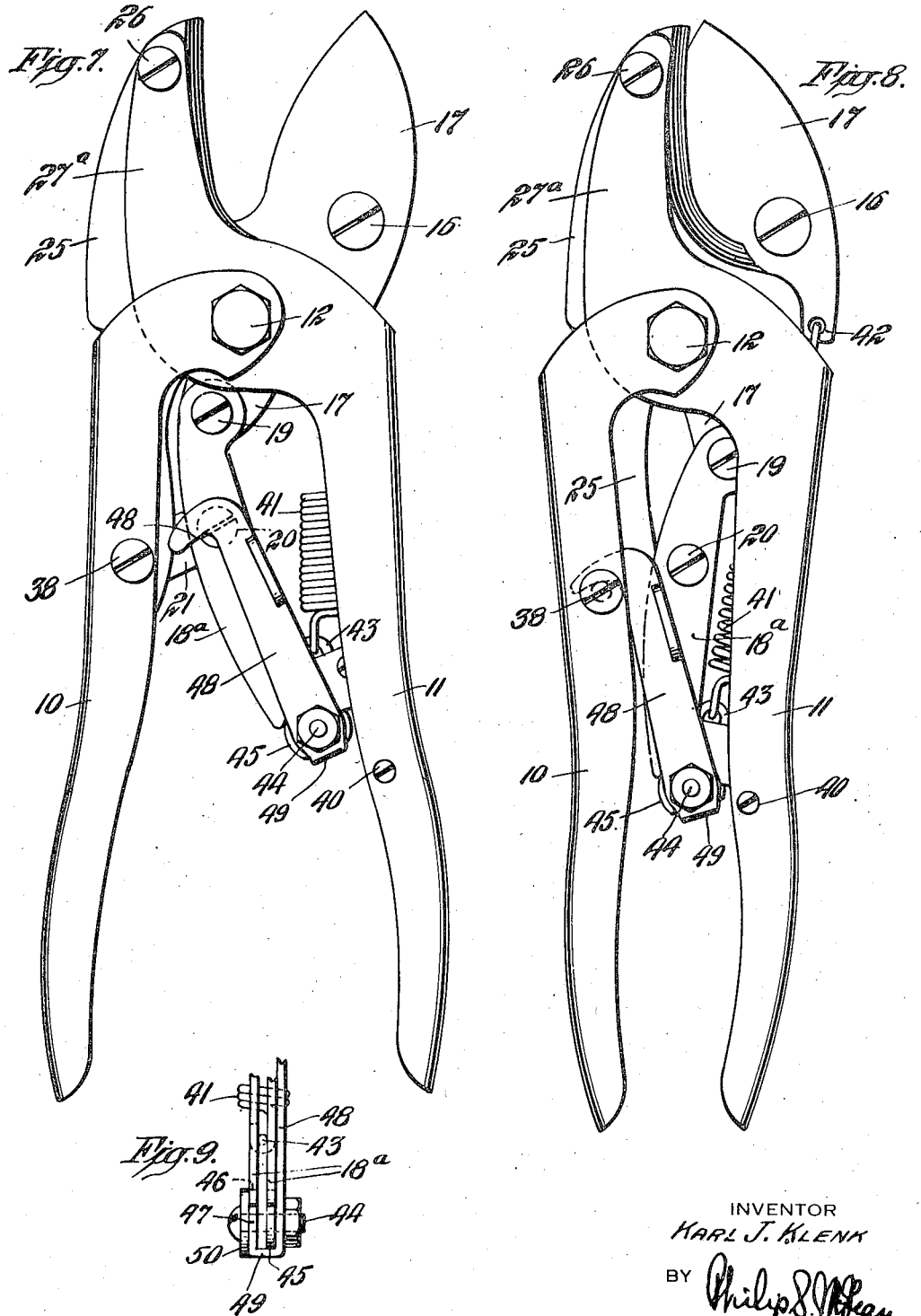

Patented Feb. 17, 1948

2,436,260

UNITED STATES PATENT OFFICE 2,436,260

PRUNING SHEARS AND THE LIKE

Karl J. Klenk, Wilmington, Del.

Application June 19, 1945, Serial No. 600,262

5 Claims. (Cl. 30—239)

The invention herein disclosed relates to gripping and cutting tools in the nature of pruning shears.

Objects of the invention are to provide a tool of this character which will be powerful in its action and which when embodied in the form of pruning shears will operate to grip and to cut branches and the like without breaking and tearing the bark.

Related objects of the invention are to accomplish the cutting with a double action circular form of draw cut and thus to shear the material from opposite sides without crushing or tearing.

Further important objects are to provide wider opening of the jaws or blades within a limited opening range of the handles, that is, within the normal grasp or grip of the fingers holding and operating the tool.

Other objects of the invention are to provide a tool of the character indicated which will be strong and durable in its construction, self-sharpening in its action and generally desirable in the purposes for which it is intended.

Other desirable objects and the novel features by which the purposes of the invention are attained are set forth or will appear in the course of the following specification.

The drawings accompanying and forming part of the specification illustrate certain present practical embodiments of the invention but structure may be modified and changed as regards these illustrations, all within the true intent and broad scope of the invention as hereinafter defined and claimed.

Fig. 1 in the drawings is an elevation of the invention as embodied in a pair of pruning shears and shown in the open relation;

Fig. 2 is a similar view showing the shears closed;

Fig. 3 is a broken, part sectional view of the parts as in Fig. 1, with the top fulcrum plate or lever removed to show internal parts;

Figs. 4 and 5 are cross sectional views as on substantially the planes of line 4—4 of Fig. 2 and line 5—5 of Fig. 1, respectively;

Fig. 6 is a broken part sectional view of a second embodiment of the invention;

Figs. 7 and 8 are elevations showing the latter form of the tool in open and closed relations;

Fig. 9 is a broken sectional detail.

The form of the invention illustrated in Figs. 1 to 5 comprises a pair of hand levers 10, 11, pivotally connected at their ends by a screw 12 and pressed apart by a spring 13.

Pivotally mounted on the handle 10, on a fulcrum screw or pin 14, is a pair of levers 15 extending beyond and arched over to the opposite side of the handle fulcrum 12, said levers carrying at their outer ends the fulcrum bolt or pin 16 for the blade 17.

The latter, as possibly best shown in Fig. 3, is fulcrumed intermediate its ends and is actuated by a pair of levers 18 pivoted to the inner end of the blade at 19 and fulcrumed at 20 on one end of the link 21, extending from said levers 18 below the handle pivot 12 over to the opposite side and there pivoted at 22 to the blade supporting levers 15.

The lower or inner ends of the blade actuating levers 18 are shown provided with inclined cam slots 23 engaged over a cross pin or screw 24 in the handle 11.

Cooperating with the mid-length fulcrumed rocking blade 17 is a companion blade 25 fulcrumed at its outer end at 26 between blade supporting plates or levers 27. These levers are shown as fulcrumed at their inner ends on a pivot stud or screw 28 on the handle 11 and extending beyond and arched over to the opposite side of the handle pivot 12.

The second described or end fulcrumed blade 25 is actuated by means of a link 29 pivoted at one end to the inner end of the blade at 30 and pivoted at the opposite end at 31 between the first described jaw closing levers 18.

In Fig. 3 it will be seen that in the closing of the handles 10, 11, the levers 18 will fulcrum at 20 on the end of link 21, the cam connection at 23, 24, rocking these levers and causing them, through pivotal connections 19 and 30, 31, to swing blade 17 about mid-fulcrum 16 and blade 25 about end-fulcrum 26. Blade 17 will be thereby rotated in a left-handed and inwardly closing direction and blade 25 at the same time will be rotated from its outer end in a right-handed and outwardly closing direction.

The two blades are thus given circular movements in opposite directions, causing them to grip and to shear cut into interposed material. These opposed shear or draw cuts hold the material against slipping or rolling, producing a clean cut without injury, in the case of pruning shears, to the bark and surface material adjoining the cut.

The mounting of the blades on levers fulcrumed on the opposite handles provides a self-compensating action enabling the blades to automatically equalize their shearing loads.

The levers 27 carrying the blade 25 are shown secured together and held in parallel relation by through screws 32, 33, engaged in their intermediate portions, and the blade operating between them is shown as slotted at 34, 35, for clearance of these securing screws or bolts. This blade also is shown as offset at 36 at its cutting end to bring it into cooperative relation with blade 17, and to take care of this offset a spacer 37, Fig. 4, is disposed between such offset and the fulcrum plate 27 at that side of the blade.

The second form of the invention appearing in Figs. 6, 7 and 8 embodies the same general principles as to mounting the jaws or blades on supports extended from the opposite sides of the handles and pivoting one blade 17 on an axis 16 intermediate its ends and the other blade 25 at its outer end at 26.

The structure is somewhat simplified, however, by making the supporting extensions integral with the handles, instead of as separate levers (such as 15 and 27, Fig. 1) fulcrumed on the handles.

The handle 10 which, as in the first form, is of "folded" construction, has the side which is at the rear in Fig. 6 extended over to the opposite side of the pivot 12 as a support 15a for the intermediate fulcrum 16, and the side of the handle 11 which appears at the front in Figs. 7 and 8 is extended over to the opposite side at 27a to carry the end fulcrum 26.

The blade closing lever 18a fulcrums at 20 on a link 21 but the link in this instance is directly pivoted on handle 10 at 38 instead of being pivoted on a swing support such as the lever 15 in Fig. 3.

The lower or inner end of lever 18a is shown as having an offset cam extension 39, Fig. 6, engaging within the hollow of handle 11, confined in this relation by the screw or pin 40 extending across the folded portion of the handle.

A tension spring 41 connected between the inner portion 42 of blade 17 and a lug 43 engaged on pin 44 and which latter has a bearing against the offset of lever 18a, provides the means for effecting opening movement of the jaws and handles.

To provide an antifriction type of bearing the pin 44 is pivoted in a washer 45 pivotally entered in a part circular seat 46 in one side of lever 18a and the opposite side of this duplicate lever has a corresponding seat 46 for the rounded end 47 of a hook lever 48, which as shown in Fig. 8, can be engaged over the pin or screw 38 in the hollow of handle 10 to secure the tool in jaw closed relation. As shown in Fig. 9, the securing hook 48, pivotally engaged on the screw or stud 44, overlies the bearing washer 45 at one side to confine it in the bearing 46 and extends at 49 across the bottom of this washer over to the other side where it is bent parallel with the hook portion to provide the second bearing 47. A washer 50 on this end of the pivot 44 overlying this side of the link 18a confines the bearing portion 47 in place.

In both forms of the invention illustrated the blades or jaw members have a compound, part circular movement providing, in the case of blades, the effect of a double acting circular draw cut. The leverage systems provide ample power, with wide opening of the jaws within the range of a convenient hand grip opening of the handle levers. The circular, double shear action cuts the material without bruising or tearing the surface, preventing, in the case of pruning shears, injury to the bark of growing plants.

While illustrated as embodied in pruning shears, it is realized that the invention may be incorporated in other tools more or less similar in action. The jaw members, therefore, may be considered as actual jaws or, as here illustrated, in the nature of cutting blades.

The structures are strong and durable and the parts are held aligned in self-sharpening relation.

What is claimed is:

1. A tool of the character disclosed comprising pivotally connected hand levers, supports extending from said hand levers to the opposite sides of and beyond the pivotal connection between the levers, companion jaw members, one pivoted intermediate its ends on one of said supports and the other pivoted at its outer end on the other of said supports and leverage means actuated by said hand levers and connected with said pivoted jaw members and including a jaw closing lever fulcrumed intermediate its ends to one hand lever, operatively engaged at its inner end by the other hand lever and pivotally connected at its outer end with the inner ends of the intermediately and end pivoted jaw members.

2. A tool of the character disclosed comprising pivotally connected hand levers, supports extending from said hand levers to the opposite sides of and beyond the pivotal connection between the levers, companion jaw members, one pivoted intermediate its ends on one of said supports and the other pivoted at its outer end on the other of said supports and leverage means actuated by said hand levers and connected with said pivoted jaw members and including a jaw closing lever fulcrumed intermediate its ends to one hand lever, operatively engaged at its inner end by the other hand lever and pivotally connected at its outer end with the inner ends of the intermediately and end pivoted jaw members, said supports being in the form of levers pivotally mounted on the hand levers.

3. A tool of the character disclosed comprising pivotally connected hand levers, supports extending from said hand levers to the opposite sides of and beyond the pivotal connection between the levers, companion jaw members, one pivoted intermediate its ends on one of said supports and the other pivoted at its outer end on the other of said supports and leverage means actuated by said hand levers and connected with said pivoted jaw members and including a jaw closing lever fulcrumed intermediate its ends to one hand lever, having a cam engagement at its inner end with the other hand lever and pivotally connected at its outer end with the inner ends of said intermediately and end pivoted jaw members.

4. A tool of the character disclosed comprising pivotally connected hand levers, supports extending from said hand levers to the opposite sides of and beyond the pivotal connection between the levers, companion jaw members, one pivoted intermediate its ends on one of said supports and the other pivoted at its outer end on the other of said supports and leverage means actuated by said hand levers and connected with said pivoted jaw members and including a jaw closing lever fulcrumed intermediate its ends to one hand lever, operatively engaged at its inner end by the other hand lever and pivotally connected at its outer end with the inner ends of the intermediately and end pivoted jaw members, said oppositely extending jaw member supports being integral extensions of said hand levers.

5. A tool of the character disclosed comprising pivotally connected hand levers, cross supports extending from the respective hand levers to the opposite sides of the pivotal connection between the levers, a blade pivoted intermediate its ends on one of said supports, a companion blade pivoted at its outer end on the other of said supports and lever mechanism between said hand levers and actuated thereby, said lever mechanism having power multiplying connections with the respective blades and including a blade closing lever fulcrumed intermediate its ends to one hand lever, operatively engaged at its inner end by the other hand lever and pivotally connected at its outer end with the inner ends of said intermediately and end pivoted blades.

KARL J. KLENK.

REFERENCES CITED

The following references are of record in the file of this patent:

UNITED STATES PATENTS

| Number | Name | Date |
| --- | --- | --- |
| 1,446,540 | Bernard | Feb. 27, 1923 |
| 2,190,911 | Nebel | Feb. 20, 1940 |